(12) United States Patent
Lee et al.

(10) Patent No.: US 11,135,918 B2
(45) Date of Patent: Oct. 5, 2021

(54) ERROR DETECTION IC OF VEHICLE AV SYSTEM

(71) Applicant: LG Electronics Inc., Seoul (KR)

(72) Inventors: Kihoon Lee, Seoul (KR); Kyunglack Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/645,718

(22) PCT Filed: Jan. 10, 2018

(86) PCT No.: PCT/KR2018/000450
§ 371 (c)(1),
(2) Date: Mar. 9, 2020

(87) PCT Pub. No.: WO2019/050105
PCT Pub. Date: Mar. 14, 2019

(65) Prior Publication Data
US 2020/0282831 A1    Sep. 10, 2020

(30) Foreign Application Priority Data
Sep. 7, 2017  (KR) .......................... 10-2017-0114661

(51) Int. Cl.
*B60K 35/00* (2006.01)
*B60K 37/00* (2006.01)

(52) U.S. Cl.
CPC .............. *B60K 35/00* (2013.01); *B60K 37/00* (2013.01); *B60K 2370/157* (2019.05)

(58) Field of Classification Search
None
See application file for complete search history.

(56) References Cited

U.S. PATENT DOCUMENTS

| | | | |
|---|---|---|---|
| 2005/0200631 A1* | 9/2005 | Pan ...................... | G09G 3/3611 345/600 |
| 2007/0109234 A1* | 5/2007 | Ho ........................ | G09G 3/3611 345/87 |

(Continued)

FOREIGN PATENT DOCUMENTS

| EP | 3040862 | 12/2016 |
|---|---|---|
| JP | 2017092835 | 5/2017 |
| WO | WO 2017104346 | 6/2017 |

OTHER PUBLICATIONS

EP Search Report in European Appln. No. 18854796.2, dated May 3, 2021, 10 pages.

*Primary Examiner* — Thomas S McCormack
(74) *Attorney, Agent, or Firm* — Fish & Richardson P.C.

(57) ABSTRACT

The present disclosure relates to an error detection IC including: a first interface unit configured to receive a first signal for outputting a specific fixed image to a display apparatus provided in a vehicle; a memory in which data for one or more fixed images are stored; a signal processing unit configured to select a fixed image to be output to the display apparatus from among the one or more fixed images, based on the first signal, and to output a second signal for outputting the selected fixed image to the display apparatus; an image determination unit configured to provide a signal informing an error of the fixed image to a controller of the vehicle, when it is determined that the error exists in data for the selected fixed image included in the second signal, based on the data stored in the memory; and a second interface unit configured to provide the second signal to a display module.

18 Claims, 11 Drawing Sheets

(56) References Cited

U.S. PATENT DOCUMENTS

2008/0231579 A1\* 9/2008 Vasquez ............... G09G 3/2092
345/98
2012/0036418 A1 2/2012 Morino et al.

\* cited by examiner

ERROR DETECTION IC OF VEHICLE AV SYSTEM

CROSS-REFERENCE TO RELATED APPLICATIONS

This application is a National Stage application under 35 U.S.C. § 371 of International Application No. PCT/KR2018/000450, filed on Jan. 10, 2018, which claims the benefit of Korean Application No. 10-2017-0114661, filed on Sep. 7, 2017. The disclosures of the prior applications are incorporated by reference in their entirety.

TECHNICAL FIELD

The present disclosure relates to an error detection IC for detecting an error of an AV system provided in a vehicle.

BACKGROUND ART

A vehicle is an apparatus for moving in a desired direction by a user who rides in the vehicle. An example of the vehicle is a car.

Meanwhile, for the convenience of user using a vehicle, there is a trend that the vehicle is equipped with various electronic devices.

For example, an Audio Visual system (AV) system may be mounted in a vehicle to provide various images and sounds.

The AV system for vehicle may include at least one display apparatus for outputting an image and at least one sound output device for outputting a sound.

The vehicle may include various display apparatuses in a dashboard. For example, an instrument panel is provided in front of the driver's seat, and a center information display (CID) is provided in a center fascia. Recently, as a display technology is developed and necessary information in the vehicle is diversified, the instrument panel may also be configured of an LCD module.

An LCD module, which is a kind of display apparatus, is configured of an LCD panel displaying an image, an LCD driver IC for driving the LCD panel, and a timing controller (T-CON) for providing image data and a control signal to the LCD driver IC. The T-CON controls the LCD driver IC to display a specific image on the LCD panel, based on image data and a control signal provided by a control device outside the LCD module.

Among the images displayed on the instrument panel, there is a fixed image which is an icon indicating information related to a vehicle. The fixed image is an icon whose display position and display type on the instrument panel do not change. For example, the fixed image may be a low fuel icon displayed when the fuel is low, a seat belt icon displayed when a seat belt is not worn, or the like. Since the fixed image is directly related to safety, if an error occurs during the output of the fixed image, it is necessary to quickly and accurately determine the error occurrence.

The existing instrument panel is composed of a panel on which a vehicle speedometer, an engine speedometer, and various indicators are printed, and an LED. In this case, although it is not possible to output various images, if the LED is turned on, it is unlikely that an error occurs during the image output process in which a specific image is output. On the other hand, when the entire instrument panel is composed of LCD module, various images can be output, but, relatively, errors are more likely to occur during image output.

In the case of outputting a fixed image to a vehicle display apparatus composed of an LCD module, an error is relatively likely to occur, and therefore, it is necessary to quickly and accurately determine whether an error occurs.

Recently, in response to ISO26262, which is an international standard for functional safety of automobiles, the functional safety response of an electronic control system provided in the vehicle is important. For example, even in the instrument panel area implemented by LCD, there is a need for a system for detecting an error condition of a fixed image displayed on the instrument panel and a warning sound related to this.

Conventionally, Timing Control ICs (T-CONs) for detecting an error on a fixed image of an LCD instrument panel have been developed, but there is a problem that it is applicable only to an LCD module having no T-CON.

The conventional LCD module adopts Open LVDS Display Interface (LDI) as an interface standard, but the conventional T-CON for detecting an error outputs a signal conforming to a mini-Low-Voltage Differential Signaling (LVDS) interface standard. Thus, it is not applicable to the existing LCD module equipped with T-CON, and an LCD module having no T-CON must be newly designed, thereby incurring an additional development cost.

Since the existing LCD module is equipped with the T-CON, there is a problem that the T-CON for detecting an error cannot be applied to the existing LCD module. Accordingly, there is a need to develop an IC that can be applied to an existing LCD module equipped with a T-CON and can detect an error.

In addition, there is a problem in that the conventional T-CON for detecting an error on the fixed image cannot detect an error on a warning sound, and when a different warning sound is preset for each fixed image, it cannot be determined whether the fixed image output on the instrument panel and the output warning sound are matched.

DISCLOSURE

Technical Problem

In order to solve the above problem, an object of an embodiment of the present disclosure is to provide an error detection IC which is applied to an existing LCD module equipped with a T-CON and detects an error for a fixed image.

In addition, in order to solve the above problem, another object of an embodiment of the present disclosure is to provide an error detection IC which detects the error on a warning sound, and determines whether the fixed image output on the instrument panel and the output warning sound are matched.

The objects of the present disclosure are not limited to the above-mentioned objects, and other objects that are not mentioned will be clearly understood by those skilled in the art from the following description.

Technical Solution

In order to achieve the above objects, an error detection IC according to an embodiment of the present disclosure includes: a first interface unit configured to receive a first signal for outputting a specific fixed image to a display apparatus provided in a vehicle; a memory in which data for one or more fixed images are stored; a signal processing unit configured to select a fixed image to be output to the display apparatus from among the one or more fixed images, based on the first signal, and to output a second signal for outputting the selected fixed image to the display apparatus; an image determination unit configured to provide a signal informing an error of the fixed image to a controller of the vehicle, when it is determined that the error exists in data for the selected fixed image included in the second signal, based on the data stored in the memory; and a second interface unit configured to provide the second signal to a display module.

In order to achieve the above objects, an error detection IC according to an embodiment of the present disclosure further includes: a third interface unit configured to receive an audio signal for outputting sound to a sound output device of the vehicle; an audio determination unit configured to provide a signal informing of an error of audio to the controller of the vehicle, when it is determined that an error exists in the audio signal; and a fourth interface unit configured to provide the audio signal to the sound output device.

In order to achieve the above objects, an error detection IC according to an embodiment of the present disclosure further includes a matching determination unit configured to provide the controller with a signal informing that an output fixed image and a sound are not matched, if it is determined that the sound output to the sound output device is not matched to the fixed image output to the instrument panel, based on the data for the audio signal and the warning sound corresponding to each fixed image stored in the memory Specific details of other embodiments are included in the detailed description and the drawings.

Advantageous Effects

According to an embodiment of the present disclosure, there are one or more of the following effects.

First, since it can be applied to existing LCD module equipped with T-CON and can detect an error on a fixed image, it can be applied to existing AV system for vehicle and there is no need to design a new LCD module having no T-CON. Accordingly, there is an effect of reducing a development cost.

Second, there is an effect of detecting an error on the fixed image and an error on the warning sound at the same time.

Third, when the warning sound matched with the fixed image is preset, it is possible to determine whether the output fixed image and the warning sound are matched.

The effects of the present disclosure are not limited to the effects mentioned above, and other effects not mentioned can be clearly understood by those skilled in the art from the description of the claims.

MODE FOR INVENTION

Figure 1:
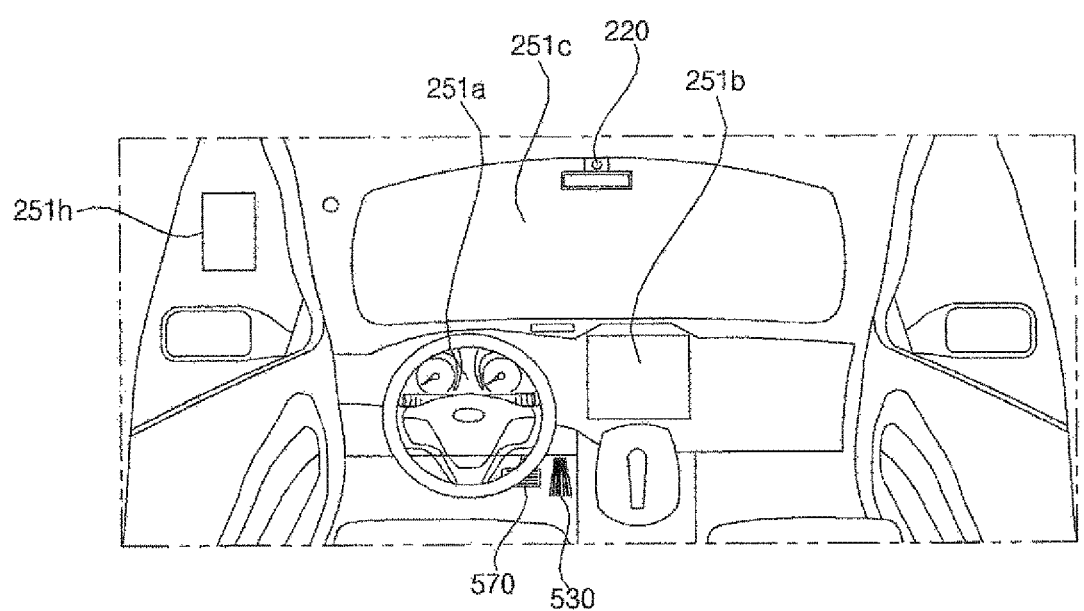
FIGS. 1 and 2 are diagrams for explaining an arrangement of a vehicle display apparatus inside a vehicle according to an embodiment of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

Although the terms "first," "second," etc., may be used herein to describe various components, these components should not be limited by these terms. These terms are only used to distinguish one component from another component.

When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle described herein may include an automobile and a motorcycle. In the following, an automobile is mainly described for a vehicle.

The vehicle described herein may include all of an internal combustion engine vehicle having an engine as a power source, a hybrid vehicle having an engine and an electric motor as a power source, an electric vehicle having an electric motor as a power source, and the like.

A display apparatus provided in a vehicle of the present disclosure may be a display apparatus provided in the vehicle. For example, the vehicle display apparatus may be an instrument panel, a center information display (CID), a head up display (HUD), or the like.

The display apparatus provided in the vehicle may display graphic object corresponding to various information.

For example, a display apparatus provided in a vehicle may be implemented using at least one of a liquid crystal display (LCD), a thin film transistor-liquid crystal display (TFT LCD), an organic light-emitting diode (OLED), a flexible display, a 3D display, and an e-ink display.

For example, a vehicle display apparatus may be implemented using a touch screen by forming a mutual layer structure or being integrally formed with a touch input apparatus.

For example, the vehicle display apparatus may be implemented using a head up display (HUD).

For example, the vehicle display apparatus may be implemented using a transparent display.

The display apparatus provided in the vehicle of the present disclosure may be a display module. The display module is controlled by a main system or a graphic processor 300 separately provided in the vehicle and receives various image data. Hereinafter, the main system of the vehicle is referred to as a controller 400. The display module may display an image corresponding to image data transmitted from the controller 400 or the graphic processor 300. The graphic processor 300 may be included in the controller 400 or may exist separately from the controller 400. In the following description, it is assumed that the graphic processor 300 and the controller 400 exist separately.

Hereinafter, a display apparatus provided in a vehicle will be described with reference to the drawings.

Figure 2:
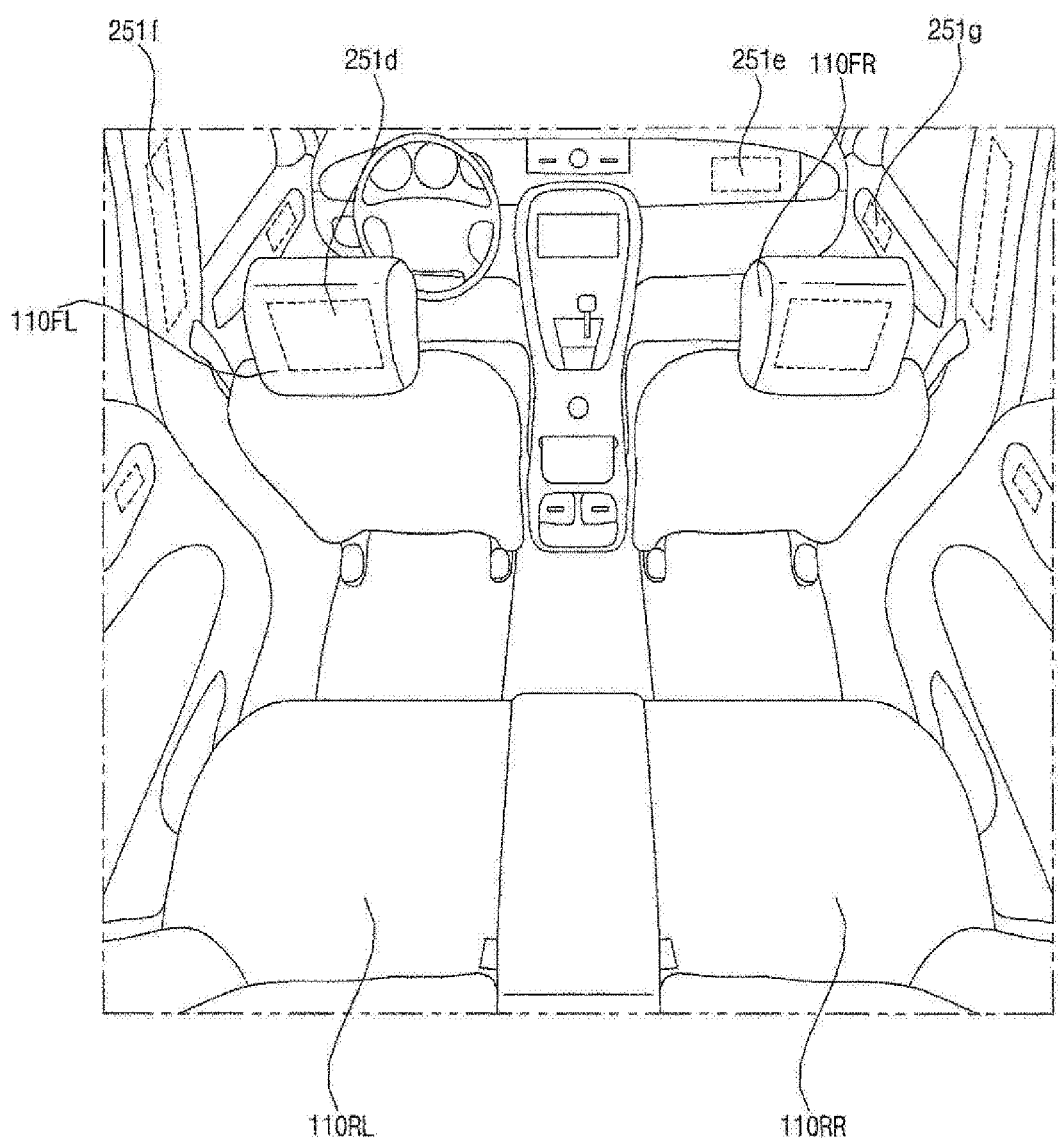

FIGS. 1 and 2 are diagrams for explaining an arrangement of a vehicle display apparatus inside a vehicle according to an embodiment of the present disclosure.

Referring to FIGS. 1 and 2, a plurality of vehicle display apparatuses 251a to 251g may be disposed inside a vehicle.

For example, a vehicle display apparatus may be disposed in at least one of one area of an instrument panel 521a, 251b, and 251e, one area of a seat 251d, one area of a pillar 251f, one area of a door 251g, one area of a windshield 251c, one area of a window 251h, one area of a center console, one area of a head lining, one area of a sun visor, and one area of a steering wheel.

The vehicle display apparatus may be implemented using the instrument panel 251a. The conventional instrument panel is composed of a panel on which various measurement systems are printed and a light emitting device, but the instrument panel according to an embodiment of the present disclosure may be implemented using an LCD module. When the instrument panel is implemented using the LCD module, it is possible to provide a driver with more various information in various types, in comparison with the conventional instrument panel.

When the vehicle display apparatus is implemented using a HUD or a transparent display, the vehicle display apparatus may be disposed in the wind shield or the window.

When the vehicle display apparatus is implemented using a HUD, the vehicle display apparatus may drive a projection module provided separately to project an image displaying various information onto a wind shield or a window.

When the vehicle display apparatus is implemented using a transparent display, the vehicle display apparatus may have a certain transparency. The vehicle display apparatus may display a specific image while having a certain transparency. The transparent display may include at least one of a transparent thin film electroluminescent (TFEL), a transparent organic light-emitting diode (OLED), a transparent liquid crystal display (LCD), a transmission-type transparent display, and a transparent light emitting diode (LED) display, in order to have transparency. The transparency of the transparent display can be adjusted.

The vehicle display apparatus may display a fixed image. The fixed image is a kind of graphic object displayed on the vehicle display apparatus.

The fixed image is a graphic object that is displayed on the vehicle display apparatus to inform passengers of information related to the vehicle.

The information related to the vehicle may be information related to any one of an operation state of a device provided in the vehicle, a device requiring overhaul, and a fuel. In addition, the information related to the vehicle may inform the state of the vehicle that the driver should recognize, the surrounding situation, the dangerous situation, and the like. For example, information related to the vehicle may be information related to, for example, the fuel shortage, the non-wearing of the seat belt, the existence of collision hazard, the existence of icy road, the prohibition of entry of the vehicle into a specific area, the failure or error of the components provided in the vehicle, the operation state of the current components, or the like. The type of the fixed image may be determined according to the type of the above-described information. Accordingly, there may be a plurality of fixed images.

For example, the fixed image may be an icon for notifying information related to the vehicle. The icon may have a shape indicating information related to the vehicle.

The fixed image is an image in which the display position and shape on the display apparatus do not change. In detail, the fixed image may have a preset display position and shape corresponding to the type of information that the fixed image informs. For example, in the case of a fixed image indicating a fuel shortage, the shape of the fixed image is a shape of a fuel tank, and the display position may be a specific point. A detailed description of the fixed image will be described later with reference to FIGS. 6 and 8.

Figure 3:
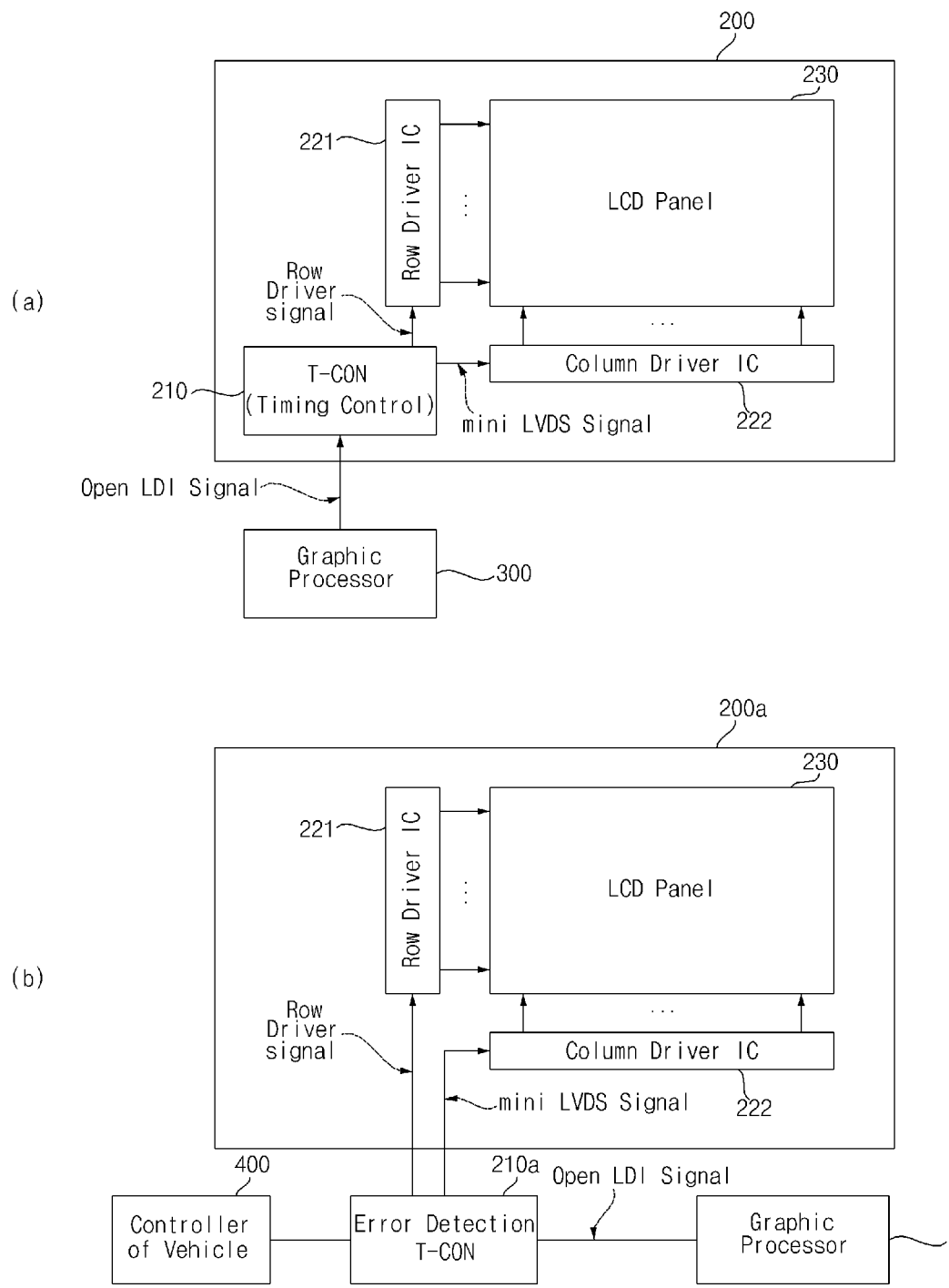
FIG. 3 is a block diagram illustrating a structure of a conventional vehicle display system.

FIG. 3 is a block diagram illustrating a structure of a conventional vehicle display system.

FIG. 3A is a diagram illustrating a structure of a vehicle display system in which an error detection IC 100 does not exist.

When the error detection IC 100 does not exist, a graphic processor 300 provides a control signal to a T-CON 210 of an LCD module 200.

The LCD module 200 is composed of an LCD panel 230 which displays an image, an LCD driver IC 221, 222 for driving the LCD panel 230, and a Timing Controller (T-CON) 210 that provides image data and a control signal to the LCD driver IC 221, 222.

The T-CON 210 may control the LCD driver IC 221, 222 to display a specific image on the LCD panel 230, based on image data and a control signal provided by the graphic processor 300. The T-CON 210 transmits the image data transmitted by the graphic processor 300 to the LCD driver IC 221, 222 so that an image corresponding to the image data is displayed on the LCD panel 230.

The T-CON 210 may adjust the amount of image data transmitted to the LCD driver IC 221, 222, and the transmission timing, and control the image displayed on the LCD panel 230. The T-CON 210 can eliminate an image lingering phenomenon (retention of image) that can be displayed on the LCD panel 230 by adjusting the amount of image data transmitted to the LCD driver IC 221, 222, and the transmission timing.

The LCD driver IC 221, 222 may include a row driver IC 221 for driving a row electrode (gate electrode) of the LCD panel 230 and a column driver IC 222 for driving a column electrode (source electrode) of the LCD panel.

When the row electrode and the column electrode of the LCD panel 230 are driven according to a control signal provided by the T-CON 210, a specific image may be output to the LCD panel 230.

The signal provided by the graphic processor 300 may be a signal based on an Open LVDS Display Interface (LDI) which is an interface standard. The signal based on the Open LDI may be referred to as an Open LDI signal.

The Open LDI is a standard interface for transmitting digital display data to a display apparatus, which outputs an image, from which a display source providing display data.

The T-CON 210 may control the column electrode of the LCD panel 230 by providing a mini-LVDS signal to the column driver IC 222, based on the received Open LDI signal.

The mini-LVDS is an interface between the T-CON 210 and the column driver IC 222. The mini-LVDS signal is a signal according to mini-LVDS.

The T-CON 210 may control the row electrode of the LCD panel 230 by providing a row driver signal to the row driver IC 221, based on the received Open LDI signal.

FIG. 3B is a diagram illustrating a structure of a vehicle display system in which a T-CON 210a for detecting a conventional error exists.

The T-CON 210a (hereinafter, referred to as an "error detection T-CON") for detecting a conventional error may perform an operation of detecting an error of an output signal.

Since the error detection T-CON 210a is a T-CON that performs an additional operation of detecting an error, the error detection T-CON 210a directly provides a control signal to the LCD driver IC 221, 222 of the LCD module 200a.

Accordingly, when the T-CON 210a for detecting a conventional error is applied, the LCD module 200a does not include the T-CON.

Since a general LCD module includes a T-CON, in order to use the T-CON 210a for detecting a conventional error, the LCD module 200a having no T-CON must be designed and produced separately. Accordingly, there is a problem that the error detection T-CON 210a cannot be applied to a general LCD module.

The error detection T-CON 210a may control the column electrode of the LCD panel 230 by providing a mini-LVDS signal to the column driver IC 222, based on the received Open LDI signal.

The error detection T-CON 210a may control the row electrode of the LCD panel 230 by providing a row driver signal to the row driver IC 221, based on the received Open LDI signal.

The error detection T-CON 210a may determine whether an error exists in the mini-LVDS signal.

When it is determined that an error exists in the mini-LVDS signal, the error detection T-CON 210a may provide the controller 400 with a signal informing that the error is detected.

Figure 4:
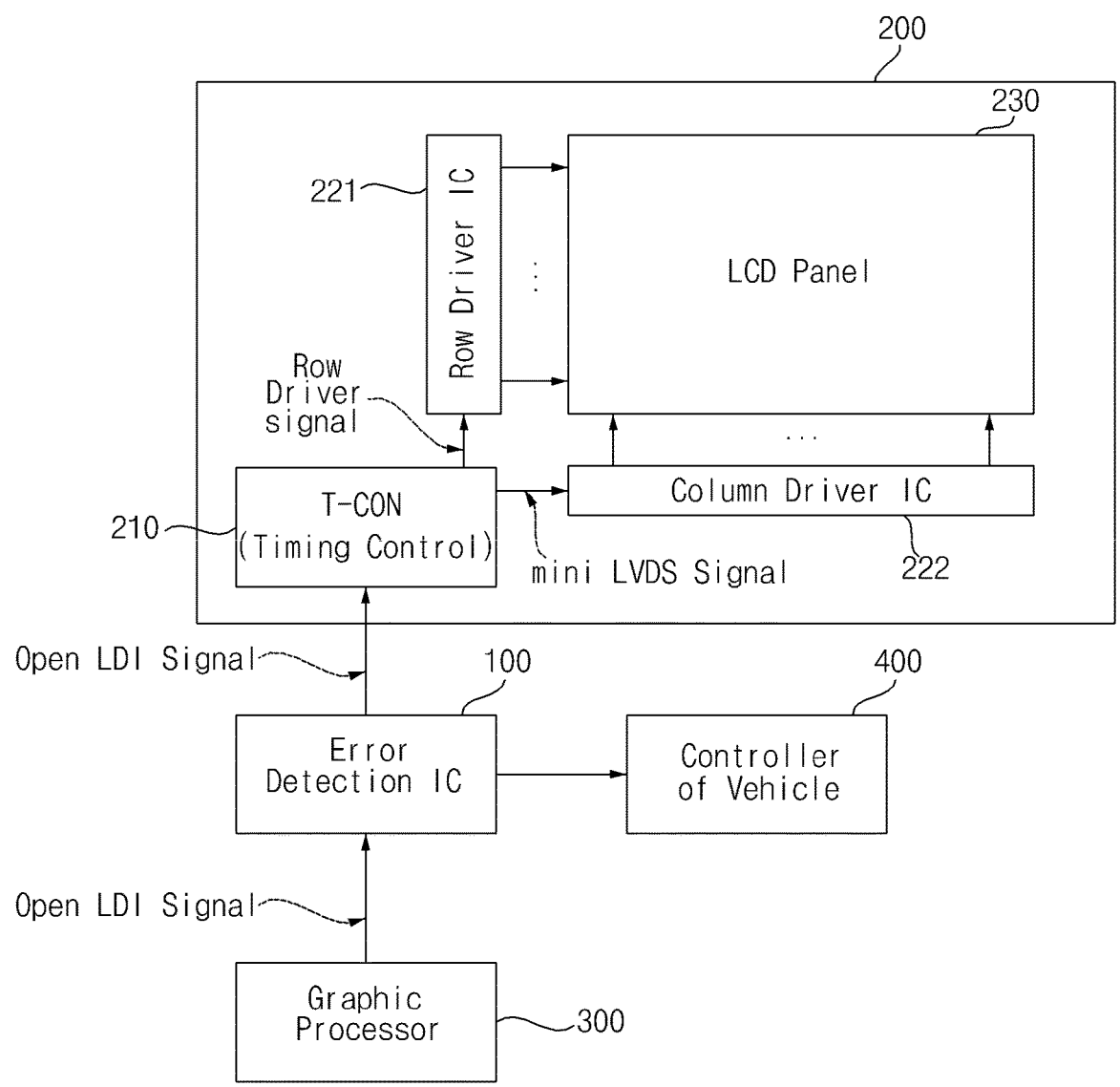
FIG. 4 is a block diagram illustrating a structure of a vehicle display system to which an error detection IC is applied according to an embodiment of the present disclosure.

FIG. 4 is a block diagram illustrating a structure of a vehicle display system to which an error detection IC 100 is applied according to an embodiment of the present disclosure.

The error detection IC 100 according to an embodiment of the present disclosure may be disposed between the graphic processor 300 and the LCD module 200.

The error detection IC 100 may receive an Open LDI signal provided by the graphic processor 300.

In an embodiment of the present disclosure, the Open LDI signal provided by the graphic processor 300 may be referred to as a first signal.

The error detection IC 100 may output a second signal for controlling the LCD module 200, based on the first signal.

The error detection IC 100 may output an Open LDI signal as the second signal. Accordingly, the error detection IC 100 according to the present disclosure may be applied to the general LCD module 200 having the T-CON 210.

The error detection IC 100 may determine whether an error exists in the second signal.

When it is determined that an error exists in the second signal, the error detection IC 100 may provide a signal for notifying the error to the controller 400.

The controller 400 may determine an error occurring in the display apparatus, based on a signal provided by the error detection IC 100.

Since the second signal provided to the T-CON 210 by the error detection IC 100 is an Open LDI signal, the T-CON 210 may control the LCD driver IC 221, 222 based on the second signal.

The T-CON 210 may control the column electrode of the LCD panel 230 by providing a mini-LVDS signal to the column driver IC 222, based on the second signal.

The T-CON 210 may control the row electrode of the LCD panel 230 by providing a row driver signal to the row driver IC 221, based on the second signal.

Figure 5:
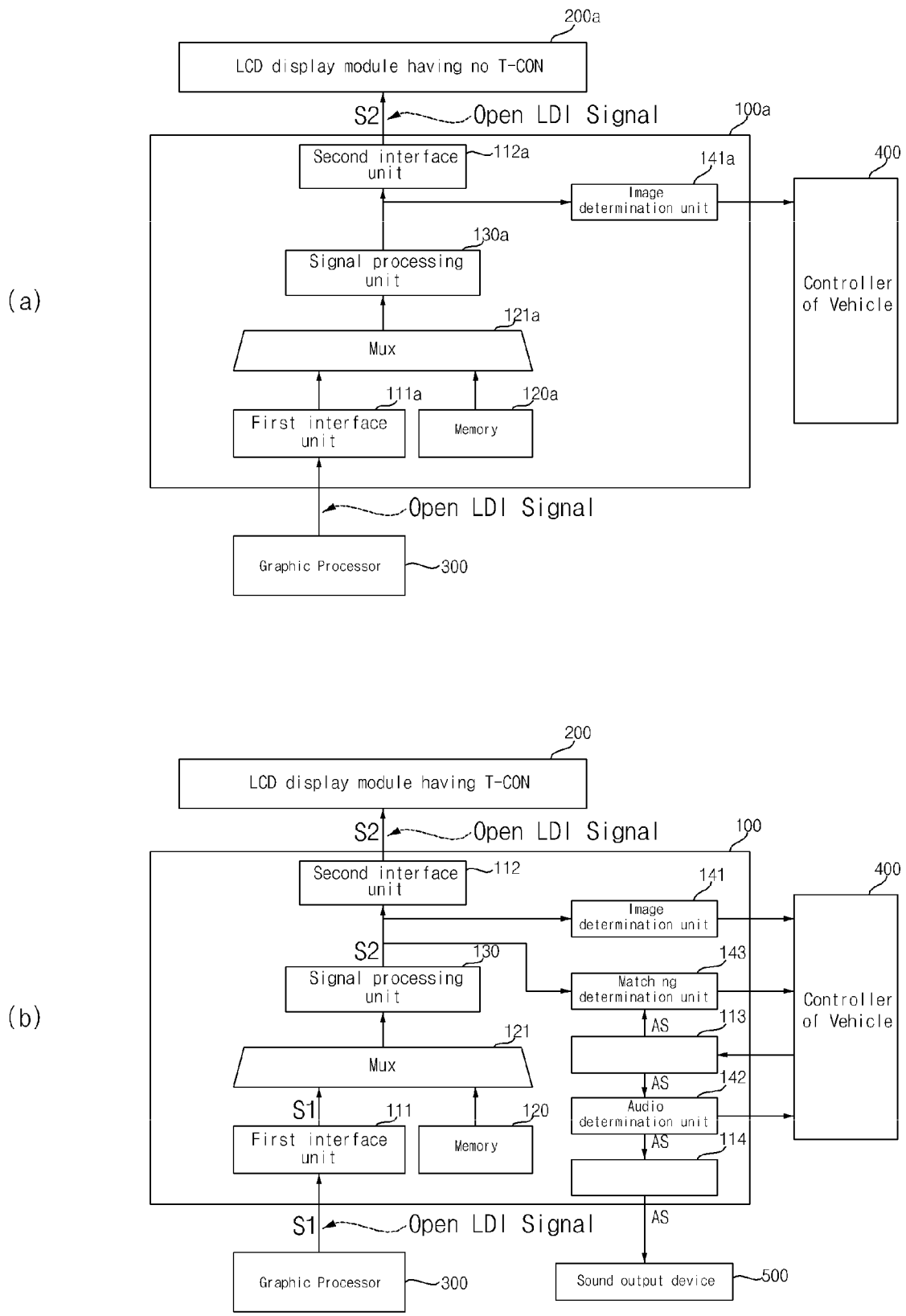
FIG. 5 is a diagram for explaining an error detection IC according to an embodiment of the present disclosure and a conventional error detection IC.

FIG. 5 is a diagram for explaining an error detection IC 100 according to an embodiment of the present disclosure and a conventional error detection IC.

FIG. 5A is a diagram showing a structure of a vehicle display system to which a conventional error detection T-CON 210a is applied.

The error detection T-CON 210a may include a first interface unit 111a that receives an Open LDI signal provided by the graphic processor 300, a memory 120a that stores data for a fixed image, a multiplexer (MUX) 121a that selects one or more of the fixed images stored in the memory 120 based on the Open LDI signal provided by the graphic processor 300 and provides to the signal processing unit 130, a signal processing unit 130a that generates a Mini LVDS signal for controlling the LCD module 200a, based on the Open LDI signal provided by the graphic processor 300 and the selected fixed image provided by the MUX 121a, a second interface unit 112a that provides a Mini LVDS signal to the LCD module 200a, and an image determination unit 141a that provides a signal to the controller 400 when it is determined that an error occurs in the output image based on the Mini LVDS signal.

In the vehicle display system to which the error detection T-CON 210a is applied, since the error detection T-CON 210a outputs a Mini LVDS signal, the LCD module 200a does not include the T-CON.

Since the LCD module contained in a general vehicle display system includes a T-CON, there is a problem that an LCD module 200a not having no T-CON must be separately designed in order to apply the error detection T-CON 210a to a vehicle display system.

FIG. 5B is a diagram showing a structure of a vehicle AV system to which the error detection IC 100 of the present disclosure is applied.

The error detection IC 100 may include a first interface unit 111, a multiplexer (MUX) 121, a memory 120, a signal processing unit 130, an image determination unit 141, and a second interface unit 112, a third interface unit 113, an audio determination unit 142, a matching determination unit 143, and a fourth interface unit 114.

The first interface unit 111 may receive a first signal S1 for outputting a specific fixed image to the display apparatus provided in the vehicle.

The display apparatus provided in the vehicle may be an instrument panel, a center information display (CID), a head up display (HUD), or the like. For example, the display apparatus may be an instrument panel implemented using a liquid crystal display (LCD) device.

The fixed image is a type of graphic object displayed on the vehicle display apparatus. The fixed image is a graphic object that is displayed on a vehicle display apparatus to inform passengers of information related to the vehicle. The fixed image may be an icon for informing information related to the vehicle. The fixed image may have a preset display position and shape corresponding to the type of information indicated by the fixed image.

The information related to the vehicle may be information related to any one of an operation state of a device provided in the vehicle, a device requiring overhaul, and a fuel. In addition, the information related to the vehicle may inform the state of the vehicle that the driver should recognize, the surrounding situation, the dangerous situation, and the like. For example, information related to the vehicle may be information related to, for example, the fuel shortage, the non-wearing of the seat belt, the existence of collision hazard, the existence of icy road, the prohibition of entry of the vehicle into a specific area, the failure or error of the components provided in the vehicle, the operation state of the current components, or the like. The type of the fixed image may be determined according to the type of the above-described information. Accordingly, there may be a plurality of fixed images.

For example, in the case of a fixed image indicating a fuel shortage on the instrument panel, the shape of the fixed image is a shape of a fuel tank, and the display position may be a specific point on the instrument panel.

The first signal S1 is a signal provided by the graphic processor 300 or the controller 400 provided in the vehicle. In the embodiment of the drawing, it is assumed that the first signal S1 is provided by the graphic processor 300.

The first signal S1 is a signal according to the Open LVDS Display Interface (LDI) which is an interface standard. The Open LDI is a standard interface for transmitting digital display data to a display apparatus, which outputs an image, from which a display source providing display data.

When the display apparatus is an instrument panel implemented using a liquid crystal display (LCD) device, the first signal S1 may include data for the instrument panel image. An explanation thereof will be described later with reference to FIG. 7.

The memory 120 may store data for one or more fixed images.

Data for one or more fixed images stored in the memory 120 are data in which information on display position, shape, size, and color of each of one or more fixed images is displayed.

The display position, shape, size, and color of the fixed image are preset according to the type of information indicated by the fixed image. For example, the display position of a fixed image indicating a fuel shortage may be set to a specific position on the instrument panel, the shape may be set to an icon indicating a person wearing a seat belt, the size may be set to a certain size, and the color may be set to red.

Accordingly, the memory 120 may store data for the display position, shape, size, and color of the fixed image indicating the fuel shortage, data for the display position, shape, size, and color of the fixed image indicating the non-wearing of the seat belt, and data for the display position, shape, size, and color of the fixed image indicating the failure of the brake device.

The MUX 121 may select a fixed image to be output to the display apparatus from among one or more fixed images stored in the memory 120 based on the first signal S1. In the embodiment of the drawing, the MUX 121 is shown in a separate configuration from the signal processing unit 130, but may be a component included in the signal processing unit 130. When the MUX 121 is included in the signal processing unit, the signal processing unit 130 may select a fixed image to be output to the display apparatus from among one or more fixed images stored in the memory 120 based on the first signal S1.

The first signal S1 may include data for a fixed image to be output to the display apparatus. In this case, the first signal S1 includes data indicating the type of the fixed image, and does not include data indicating the shape or display position of the fixed image stored in the memory 120.

The signal processing unit 130 may select a fixed image corresponding to data indicating the type of the fixed image included in the first signal S1 as an image to be output to the display apparatus, from among the fixed images stored in the memory 120.

The signal processing unit 130 may output a second signal S2 for outputting the selected fixed image to the display apparatus.

The second signal S2 is a signal according to the Open LVDS Display Interface (LDI) which is an interface standard.

In general, the LCD module 200 that is mass-produced is a module including the Timing Controller (T-CON) 210, the LCD driver IC 221, 222, and the LCD panel 230. Thus, the signal processing unit 130 of the present disclosure outputs an open LDI signal so that the error detection IC 100 may be applied to a vehicle display system implemented using the LCD module 200 which is generally mass-produced.

When the display apparatus is an instrument panel implemented using a liquid crystal display (LCD) device, the second signal S2 may include data for an instrument panel image in which the selected fixed image is overlapped. The first signal S1 may include data for the instrument panel image and data for the fixed image to be output to the instrument panel.

The signal processing unit 130 may generate data for the instrument panel image in which the selected fixed image is overlapped, based on the data for the instrument panel image included in the first signal S1 and data for the selected fixed image. The signal processing unit 130 may generate a second signal S2 for outputting data for the instrument panel image in which the selected fixed image is overlapped to the instrument panel.

The second interface unit 112 may provide the second signal S2 to the display module 200. The display module 200 may be the LCD module 200 including the Timing Controller (T-CON) 210, the LCD driver IC 221, 222, and the LCD panel 230. The second interface unit 112 may provide the T-CON 210 with the second signal S2 which is an Open LDI signal.

If it is determined that an error exists in the data for the selected fixed image included in the second signal S2, based on the data stored in the memory 120, the image determination unit 141 may provide a signal (hereinafter, referred to as a "first error signal") for notifying an error of the fixed image to the controller 400 of the vehicle.

The image determination unit 141 may determine whether an error exists in the data for the selected fixed image included in the second signal S2, based on the data stored in the memory 120.

The image determination unit 141 may determine the similarity between the fixed image stored in the memory 120 and the fixed image stored in the second signal S2, based on the data stored in the memory 120 and the data for the selected fixed image included in the second signal S2.

The similarity may be a percentile rank indicating a degree to which the data binarized from the fixed image stored in the memory 120 and the data binarized from the fixed image included in the second signal S2 coincide.

The image determination unit 141 may be determined that an error exists in the data for the selected fixed image, when the similarity between the fixed image stored in the memory 120 and the fixed image included in the second signal S2 is determined to be equal to or less than a preset reference value.

The preset reference value may be a value stored in the memory 120. For example, the reference value may be 70%.

Through the similarity determination, a method of determining whether an error exists in the data for the selected fixed image may be referred to as a statistical matching check method.

Since the second signal S2 is a signal provided to the LCD module 200, the data for the fixed image included in the second signal S2 is data indicating the fixed image output from the LCD module 200. Accordingly, when an error exists in the data for the fixed image included in the second signal S2, the error exists in the fixed image output from the LCD module 200. For example, when the fixed image output from the LCD module 200 is different from the fixed image stored in the memory 120 or is displayed in another position, the similarity between the fixed image stored in the memory 120 and the fixed image included in the second signal S2 may be determined to be equal to or less than a preset reference value.

The image determination unit 141 may determine whether an error exists in the fixed image output from the LCD module 200, by determining whether an error exists in the data for the fixed image included in the second signal S2.

The third interface unit 113 may receive an audio signal AS for outputting sound to a sound output device 500 of the vehicle.

The audio signal AS is a signal provided by the controller 400 to output a specific sound to the sound output device 500.

The third interface unit 113 may transmit an audio signal AS to the audio determination unit 142.

The audio determination unit 142 may receive the audio signal AS from the third interface unit 113.

The audio determination unit 142 may determine whether an error exists in the audio signal AS, based on the audio signal AS.

For example, the audio determination unit 142 may determine whether an error exists in the audio signal AS by using a Cyclic Redundancy Check (CRC) or a Check Sum method.

If it is determined that an error exists in the audio signal AS, the audio determination unit 142 may provide a signal (hereinafter, referred to as a "second error signal") informing the error of the audio to the controller 400 of the vehicle.

The controller 400 may determine whether an error exists in the audio signal AS, based on the second error signal.

The audio determination unit 142 may transfer the audio signal AS to the third interface unit 113.

The fourth interface unit 114 may provide an audio signal AS to the sound output device 500.

The sound output device 500 outputs sound corresponding to the audio signal AS. If an error exists in the audio signal AS, no sound is output or abnormal sound is output.

The vehicle AV system may output a preset warning sound for each fixed image.

For example, the first warning sound may be output when the fixed image indicating the non-wearing of the seat belt is output, and the second warning sound may be output when the fixed image indicating the failure of the brake device is output.

To this end, the memory 120 may further store data for a warning sound preset in correspondence with each of one or more fixed images.

The third interface unit 113 may provide the audio signal AS to the matching determination unit 143.

The matching determination unit 143 may determine whether the sound output to the sound device and the fixed image output to the display apparatus are matched, based on data about the audio signal AS, the second signal S2, and the warning sound stored in the memory 120.

For example, the matching determination unit 143 may determine whether a sound corresponding to the audio signal AS matches a fixed image corresponding to the second signal S2, based on the data of the warning sound preset for each fixed image.

For example, the matching determination unit 143 may compare the CRC or check sum value for the warning sound preset for each fixed image with the CRC or check sum value for the sound included in the audio signal AS. If it is determined that the CRC or check sum value for the preset warning sound is the same as the CRC or check sum value for the sound included in the audio signal AS, the matching determination unit 143 may determine that the sound corresponding to the audio signal AS and the fixed image corresponding to the second signal S2 are matched.

When the sound corresponding to the audio signal AS and the fixed image corresponding to the second signal S2 are matched, the sound output to the sound output device 500 and the fixed image output to the display apparatus are matched. When the sound corresponding to the audio signal AS and the fixed image corresponding to the second signal S2 are not matched, the sound output to the sound output device 500 is not matched to the fixed image output to the display apparatus.

If it is determined that the sound output to the sound output device 500 and the fixed image output to the display apparatus are not matched, the matching determination unit 143 may provide the controller 400 with a signal (hereinafter, 'third error signal') informing that the output fixed image and the sound are not matched.

For example, the warning sound preset in response to the fixed image indicating the non-wearing of the seat belt is a first warning sound, and when the fixed image indicating the non-wearing of the seat belt and a second warning sound are simultaneously output, the matching determination unit 143 may provide a third error signal to the controller 400.

The controller 400 may determine that the sound output to the sound output device 500 is not matched to the fixed image output to the display apparatus, based on the third error signal.

If it is determined that an error for the fixed image exists based on the first error signal, the controller 400 may provide a first signal S1 for re-outputting the fixed image having the error.

If it is determined that an error for the audio signal AS exists based on the second error signal or the third error signal, the controller 400 may regenerate and provide the audio signal AS having the error.

Figure 6:
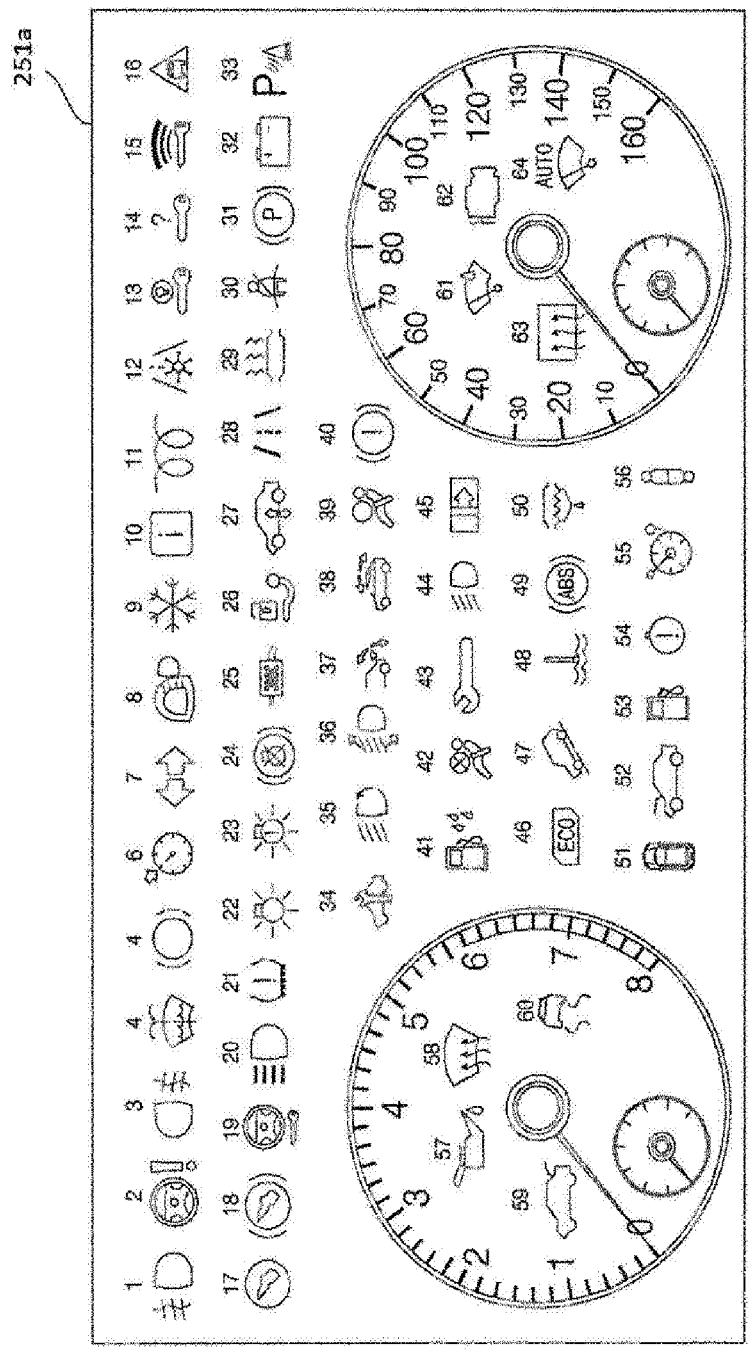
FIG. 6 is a diagram for explaining a fixed image of the present disclosure.

FIG. 6 is a diagram for explaining a fixed image of the present disclosure.

The display apparatus of vehicle may be an instrument panel 251*a*.

When the display apparatus to which the error detection IC of the present disclosure is applied is the instrument panel 251*a*, the fixed image may be an icon (1 to 64) indicating information related to the vehicle. An icon or indicator whose display position and shape do not change is a kind of fixed image.

In this case, the shape, color, and display position of the icon (1 to 64) may be determined according to the type of information indicated by the fixed image. The shape of the icon (1 to 64) may be a shape indicating specific information.

The color of the icon (1 to 64) may indicate the degree of risk of information. For example, when the color of the icon (1 to 64) is red, the degree of risk is highest, when yellow, the degree of risk is medium, and when green, the degree of risk is the lowest.

The color of the icon (1 to 64) may be changed according to the risk of information. For example, the shape or position of the icon (1 to 64) indicating the fuel shortage does not change, but the color of the icon (1 to 64) may vary depending on the degree of fuel shortage.

According to the type of information related to the vehicle, the type of the fixed image may be determined. The shape and the display position of the icon (1 to 64) may be determined according to the type of the fixed image. For example, the display position and shape of the icon (1 to 64) may be determined as in the embodiment of the drawing. The display position of each icon 1 to 64 does not change.

The data for the fixed image includes data for the display position and shape of the preset fixed image.

Hereinafter, an example of the icon (1 to 64), which is a kind of fixed image, will be described with reference to FIG. 6. A first icon denotes information indicating that a front fog light is turned on. A second icon 2 denotes information indicating that failure occurs in an electric motor or oil is insufficient. A third icon denotes information indicating that a rear fog light is turned on. A fourth icon denotes information of the shortage of washer liquid. A fifth icon denotes information indicating that a brake pad or a disc rotor needs to be inspected. A sixth icon denotes information indicating that a cruise control is turned on. A seventh icon denotes information indicating that a direction indicator light is turned on. An eighth icon denotes information indicating that an auto light sensor function is turned on. A ninth icon denotes information indicating that a winter mode in which the reaction of the engine and transmission slows in a slippery place is turned on. A tenth icon denotes information indicating that a vehicle body defect is detected or a service check cycle comes round. As described above, various icons (1 to 64) may be displayed on the vehicle display apparatus as a fixed image.

Figure 7:
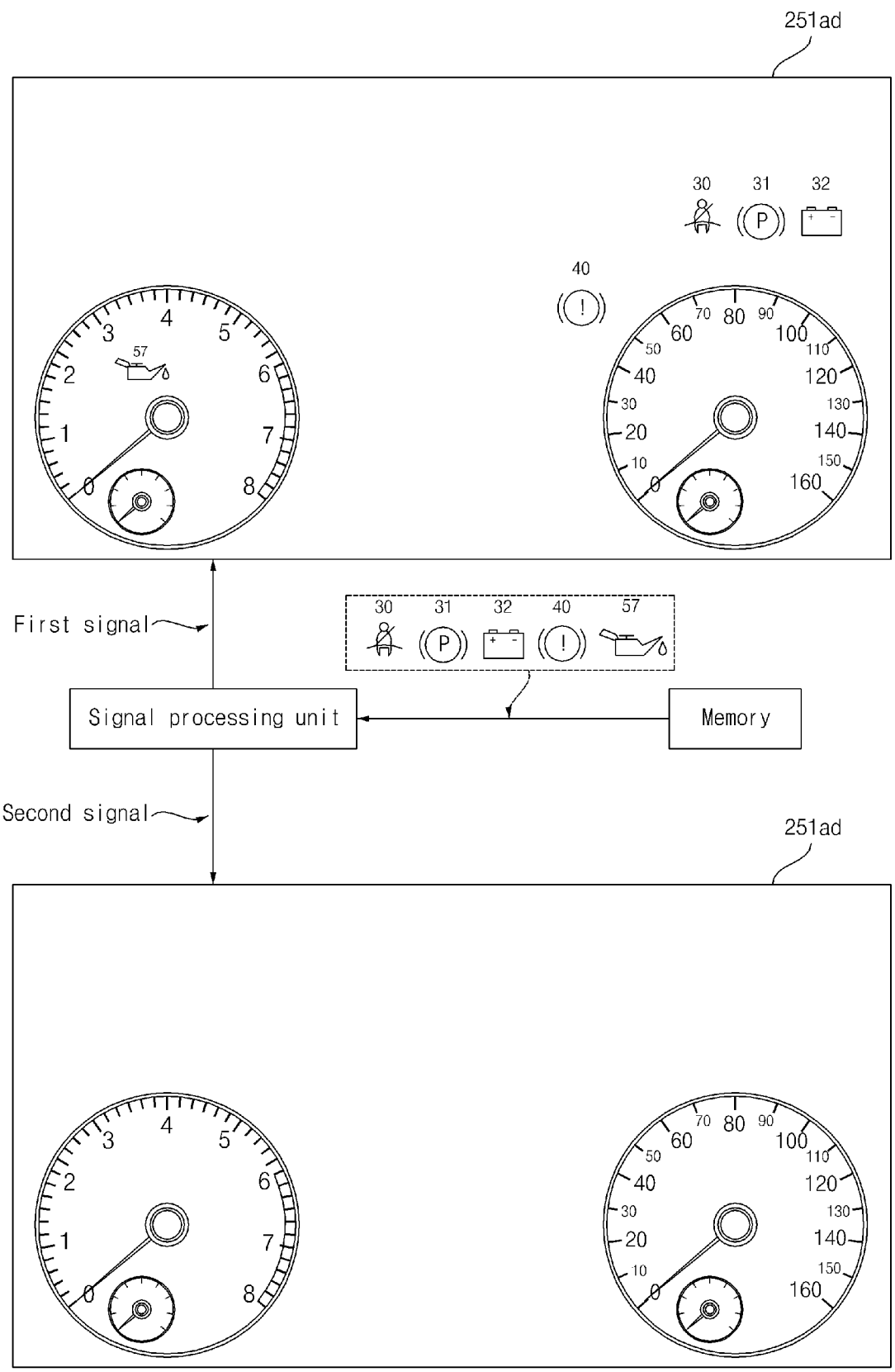
FIG. 7 is a diagram for explaining a process of outputting a fixed image on an LCD instrument panel.

FIG. 7 is a diagram for explaining a process of outputting a fixed image on an LCD instrument panel.

When the display apparatus is an instrument panel implemented using a liquid crystal display (LCD) device, the first signal may include data for an instrument panel image 251*ad*.

The instrument panel image 251*ad* is an image of an instrument panel including a vehicle speedometer and an engine speedometer.

The instrument panel image 251*ad* included in the first signal does not include the fixed image.

The graphic processor 300 provides a first signal including the instrument panel image 251*ad*, and the error detection IC 100 generates a second signal by adding a fixed image to the instrument panel image 251*ad* of the first signal.

The first signal provided by the graphic processor 300 is transmitted to the signal processing unit 130 via the first interface unit 111.

The signal processing unit 130 may select a specific fixed image, based on the first signal and the data for the fixed image stored in the memory 120.

The first signal may include data for the fixed image to be output to the display apparatus. In this case, the first signal contains data which shows only the kind of fixed image. Data indicating the shape or display position of the fixed image stored in the memory 120 is not included in the first signal.

For example, the first signal contains data notifying that a fixed image 30 indicating the non-wearing of the seat belt, a fixed image 31 indicating that the parking brake is in operation, a fixed image 32 indicating the battery shortage, a fixed image 40 indicating that a brake needs to be inspected, and a fixed image 57 indicating that there is an abnormality in the pressure of engine oil are output to the instrument panel. The first signal does not contain data for the shape or display position of each fixed image. Data for the shape or display position of each fixed image is stored in the memory 120.

The signal processing unit 130 may select the fixed image corresponding to the data contained in the first signal, from among various fixed images stored in the memory 120, as a fixed image to be output to the instrument panel.

In the embodiment of the drawing, based on the data contained in the first signal, the signal processing unit 130 may determine the fixed image 30 indicating the non-wearing of the seat belt, the fixed image 31 indicating that the parking brake is in operation, the fixed image 32 indicating the battery shortage, the fixed image 40 indicating that a brake needs to be inspected, and the fixed image 57 indicating that there is an abnormality in the pressure of engine oil to be output to the instrument panel.

The signal processing unit 130 may overlap the selected fixed images with the instrument panel image 251*ad* included in the first signal, based on the data for the shape and display position of each of the fixed image 30 indicating the non-wearing of the seat belt, the fixed image 31 indicating that the parking brake is in operation, the fixed image 32 indicating the battery shortage, the fixed image 40 indicating that a brake needs to be inspected, and the fixed image 57 indicating that there is an abnormality in the pressure of engine oil to be output to the instrument panel.

The signal processing unit 130 may generate a second signal including data for an instrument panel image 251*ad* in which the selected fixed image is overlapped.

The second signal is a control signal for outputting the instrument panel image 251*ad* in which the selected fixed image is overlapped to an LCD instrument panel. The second signal is a signal according to the Open LVDS Display Interface (LDI) which is an interface standard.

The signal processing unit 130 may provide a second signal to the LCD module 200 provided in the instrument panel through the second interface unit 112.

Accordingly, the fixed image 30 indicating the non-wearing of the seat belt, the fixed image 31 indicating that the parking brake is in operation, the fixed image 32 indicating the battery shortage, the fixed image 40 indicating that a brake needs to be inspected, and the fixed image 57 indicating that there is an abnormality in the pressure of engine oil may be displayed in preset positions, respectively.

Figure 8:
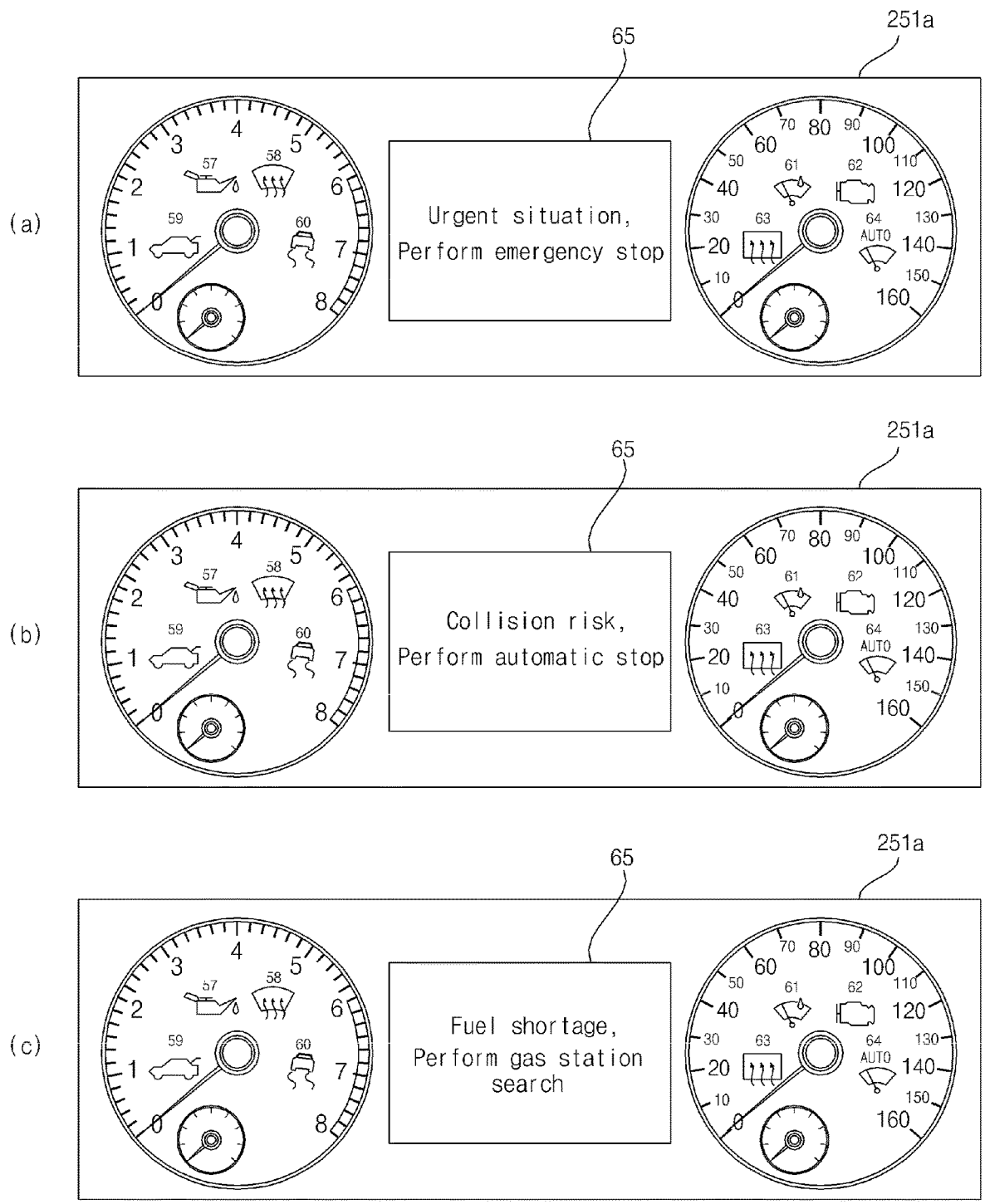
FIG. 8 is a diagram for explaining a character image that is an embodiment of a fixed image of the present disclosure.

FIG. 8 is a diagram for explaining a character image that is an embodiment of a fixed image of the present disclosure.

Referring to FIG. 8, a character image 65 indicating information related to a vehicle is also a kind of a fixed image.

The character image 65 corresponding to each situation may be displayed in a certain position on the instrument panel 251a. In this case, the text of the character image 65 may be different according to the detected situation.

The text corresponding to each situation is preset. Data for the text indicating the situation and the display position may be included in the data for the character image 65.

Data for the character image 65 may be stored in the memory 120.

The character image 65 is a shape of a text that provides information related to the vehicle.

In the embodiment of (a), the character image 65 may be a shape of a text 'urgent situation, perform emergency stop'. This means that an urgent situation occurs to perform a function of a certain emergency stop. The urgent situation means a situation in which the driver cannot perform handling or a situation in which the vehicle cannot operate normally. The emergency stop is an operation that the vehicle autonomously travels to the nearest point among the areas where the vehicle can stop. To this end, the vehicle may be equipped with various object detection apparatuses and processors for autonomous driving.

In the embodiment of (b), the character image 65 may be the shape of a text 'collision risk, perform automatic stop'. This means that a function of a preset automatic stop is performed as the current collision probability is higher than a reference probability. The collision probability may be calculated by the controller 400. To this end, the controller 400 may receive information related to an object existing around the vehicle from an object detection apparatus provided in the vehicle, and receive terrain information around the vehicle from a navigation system. Automatic stop is an operation that the vehicle stops without the driver's control. For example, automatic stop may be an operation performed by an automatic emergency braking (AEB) system.

In the embodiment of (c), the character image 65 may be the shape of a text 'fuel shortage, perform gas station search'. This means that the navigation system searches for a gas station, when it is determined that the remaining fuel amount of the vehicle is smaller than a preset reference fuel amount or a fuel amount required for a vehicle to reach a preset destination.

Figure 9:
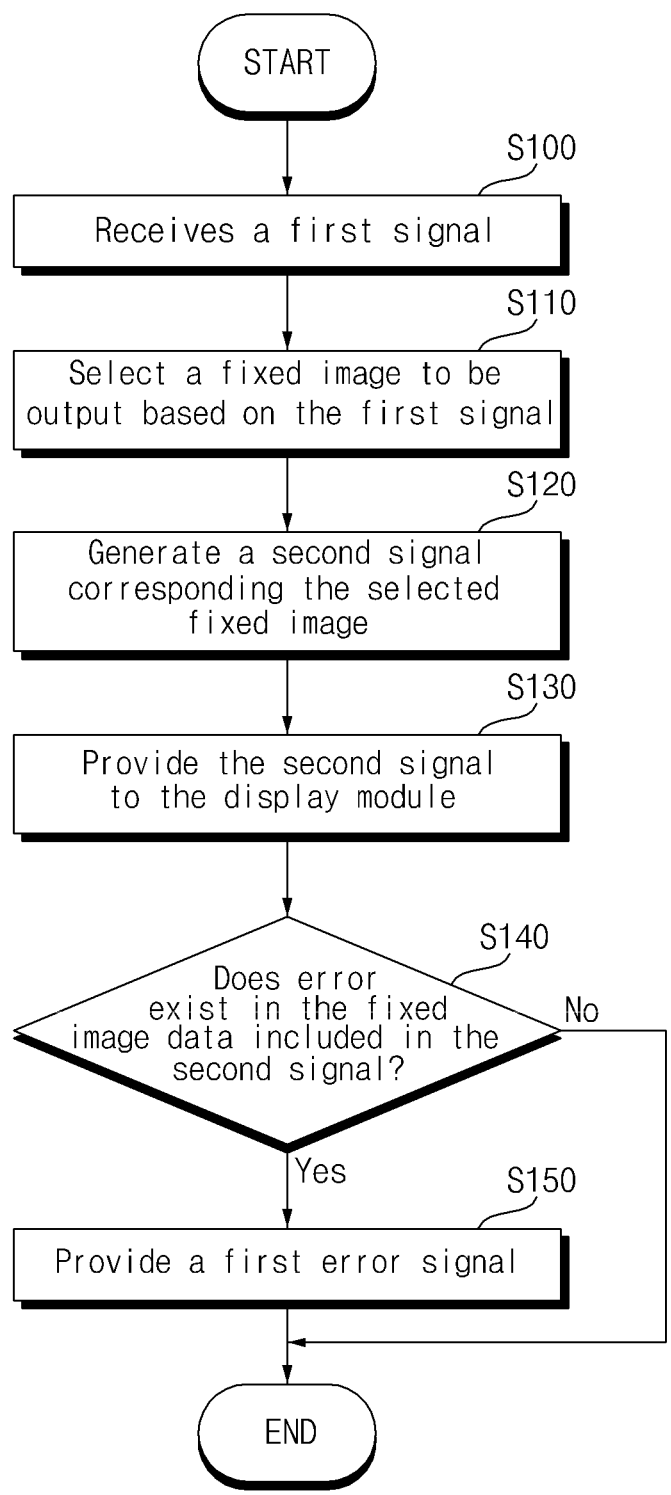
FIGS. 9 to 11 are flowcharts for explaining an operation process of an error detection IC according to an embodiment of the present disclosure.
Figure 10:
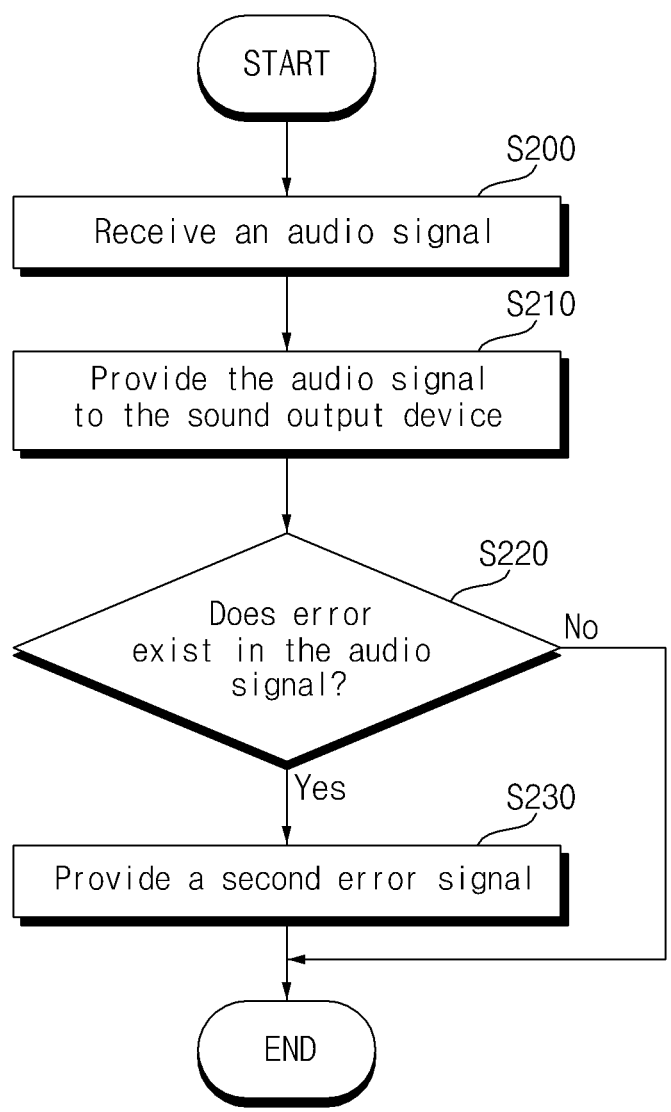
Figure 11:
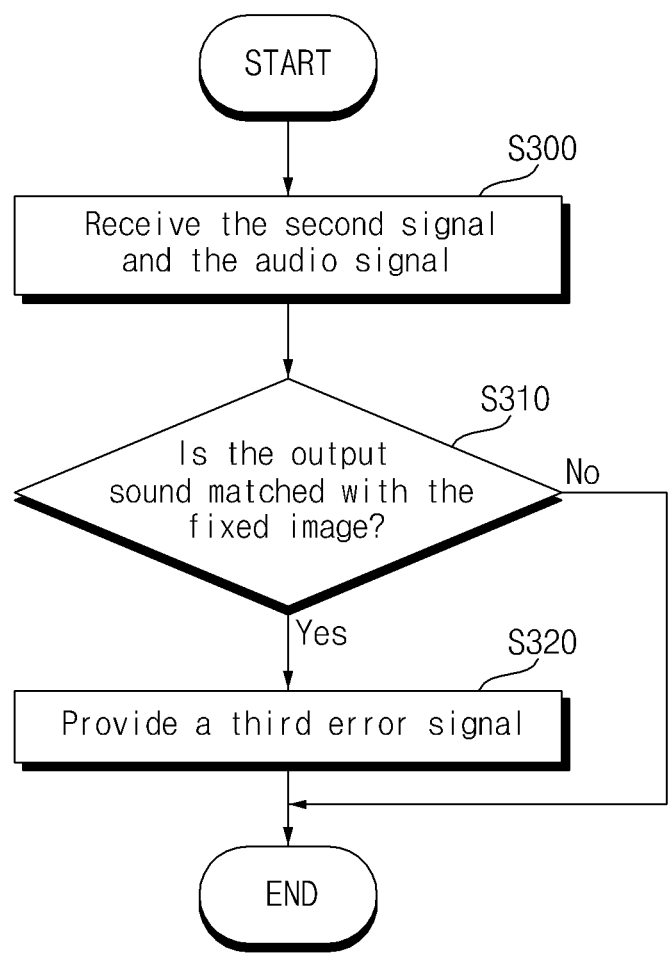

FIGS. 9 to 11 are flowcharts for explaining an operation process of an error detection IC according to an embodiment of the present disclosure.

Referring to FIG. 9, when an error exists in the fixed image output to the display module, the error detection IC 100 may provide a first error signal to the controller 400 of the vehicle. The controller 400 may determine that an error exists in the output fixed image, based on the first error signal.

The first interface unit 111 receives a first signal (S100).

The first signal is an Open LDI signal provided by the graphic processor 300 or the controller 400.

The first interface unit 111 provides the first signal to the signal processing unit 130.

The signal processing unit 130 may select a fixed image to be output to the display apparatus, based on the first signal (S110).

For example, the display apparatus may be an instrument panel implemented using an LCD device.

The first signal may include data for a fixed image to be output to the display apparatus. In this case, the first signal includes data indicating the type of the fixed image, and does not include data indicating the shape or display position of the fixed image stored in the memory 120.

The signal processing unit 130 may select the fixed image corresponding to data indicating the type of the fixed image included in the first signal as a fixed image to be output to the display apparatus, from among the fixed images stored in the memory 120.

The signal processing unit 130 may generate a second signal for outputting the selected fixed image to the display apparatus (S120).

The second signal is a signal according to the Open LVDS Display Interface (LDI) which is an interface standard.

In general, the LCD module 200 that is mass-produced is a module including the Timing Controller (T-CON) 210, the LCD driver IC 221, 222, and the LCD panel 230. Thus, the signal processing unit 130 of the present disclosure may output an open LDI signal so that the error detection IC 100 can be applied to a vehicle display system implemented using the LCD module 200 which is generally mass-produced.

When the display apparatus is an instrument panel implemented using a liquid crystal display (LCD) device, the second signal may include data for the instrument panel image in which the selected fixed image is overlapped. The first signal may include data for the instrument panel image and data for the fixed image to be output to the instrument panel.

The signal processing unit 130 may generate data for the instrument panel image in which the selected fixed image is overlapped, based on the data for the instrument panel image included in the first signal and the data for the selected fixed image. The signal processing unit 130 may generate a second signal for outputting data for the instrument panel image in which the selected fixed image is overlapped on the instrument panel.

The second interface unit 112 may provide the second signal to the display module 200 (S130).

The display module 200 may output the selected fixed image, based on the second signal. Accordingly, a fixed image may be displayed on the display apparatus.

When the display module 200 is the LCD module 200 provided in the instrument panel, an instrument panel image including a fixed image may be output to the instrument panel.

The image determination unit 141 may determine whether an error exists in the data for the selected fixed image included in the second signal, based on the data stored in the memory 120 and the second signal (S140).

If it is determined that an error exists in the data for the selected fixed image included in the second signal, based on the data stored in the memory 120, the image determination unit 141 may provide a first error signal informing the error of the fixed image to a controller 400 of the vehicle (S150).

Referring to FIG. 10, when an error exists in a sound output to the sound output device 500, the error detection IC 100 of the may provide a second error signal to the controller 400 of the vehicle. The controller 400 may determine that an error exists in the output sound, based on the second error signal.

The third interface unit 113 may receive an audio signal for outputting sound to the sound output device 500 of the vehicle (S200).

The audio signal is a signal provided by the controller 400 to output a specific sound to the sound output device 500.

The third interface unit 113 may transmit the audio signal to the audio determination unit 142.

The audio determination unit 142 may provide the audio signal transmitted from the third interface unit 113 to the fourth interface unit 114.

The fourth interface unit 114 may provide the audio signal to the sound output device 500 (S210).

The sound output device 500 may output a sound corresponding to the audio signal, based on the audio signal.

The audio determination unit 142 may determine whether an error exists in the audio signal, based on the audio signal transmitted from the third interface unit 113 (S220).

For example, the audio determination unit 142 may determine whether an error exists in the audio signal using a Cyclicical Redundancy Check (CRC) or a Check Sum method.

If it is determined that an error exists in the audio signal, the audio determination unit 142 may provide a second error signal informing the error of the audio to the controller 400 of the vehicle (S230).

The controller 400 may determine whether an error exists in the audio signal, based on the second error signal.

If an error exists in the audio signal, no sound is output or abnormal sound is output.

Referring to FIG. 11, when the output fixed image is not matched with a warning sound, the error detection IC 100 of the present disclosure may provide a third error signal to the controller 400 of the vehicle. The controller 400 may determine that the output fixed image is not matched with the warning sound, based on the third error signal.

The matching determination unit 143 may receive the second signal and the audio signal (S300).

The matching determination unit 143 may receive an audio signal through the third interface unit 113. The matching determination unit 143 may receive a second signal provided by the signal processing unit 130.

The matching determination unit 143 may determine whether the sound output to the audio device is matched with the fixed image output to the display apparatus, based on the data for the audio signal, the second signal, and the warning sound stored in the memory 120 (S310).

The vehicle AV system may output a preset warning sound for each fixed image. To this end, the memory 120 may further store data for a preset warning sound corresponding to each of one or more fixed images.

For example, a first warning sound may be output when the fixed image indicating the non-wearing of the seat belt is output, and a second warning sound may be output when the fixed image indicating the failure of the brake device is output. In this case, the fixed image indicating the non-wearing of the seat belt and the first warning sound are matched with each other, and the fixed image indicating the failure of the brake device and the second warning sound are matched with each other.

For example, the matching determination unit 143 may compare the CRC or Check sum value for the warning sound preset for each fixed image with the CRC or Check sum value for the sound included in the audio signal. When it is determined that the CRC or Check sum value for the preset warning sound and the CRC or Check sum value for the sound included in the audio signal are identical, the matching determination unit 143 determines that the sound corresponding to the audio signal and the fixed image corresponding to the second signal are matched.

When the sound corresponding to the audio signal and the fixed image corresponding to the second signal are matched, the sound output to the sound output device 500 and the fixed image output to the display apparatus are matched. When the sound corresponding to the audio signal and the fixed image corresponding to the second signal are not matched, the sound output to the sound output device 500 and the fixed image output to the display apparatus are not matched. For example, when the preset warning sound corresponding to the fixed image indicating the non-wearing of the seat belt is the first warning sound, and if the fixed image indicating the non-wearing of the seat belt and the second warning sound are simultaneously output, the output sound and the fixed image are not matched.

When it is determined that the sound output to the sound output device 500 and the fixed image output to the display apparatus are not matched, the matching determination unit 143 may provide the controller 400 with a third error signal indicating that the output fixed image and the sound are not matched (S320).

The controller 400 may determine that the sound output to the sound output device 500 is not matched with the fixed image output to the display apparatus, based on the third error signal.

The various determination units 141, 142, 143 or the signal processing unit 130 of the error detection IC 100 of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

The memory 120 of the error detection IC 100 of the present disclosure may be various storage devices such as a ROM, a RAM, an EPROM, a flash drive, a hard drive, and the like.

The present disclosure described above can be implemented as computer readable codes on a medium on which a program is recorded. The computer readable medium includes all kinds of recording apparatuses in which data that can be read by a computer system is stored. Examples of the computer readable medium include a hard disk drive (HDD), a solid state disk (SSD), a silicon disk drive (SDD), a ROM, a RAM, a CD-ROM, a magnetic tape, a floppy disk, and may also be implemented in the form of a carrier wave (e.g., transmission over the Internet). In addition, the computer may include a processor or a controller. Accordingly, the above detailed description is to be considered in all respects as illustrative and not restrictive. The scope of the present disclosure should be determined by rational interpretation of the appended claims, and all changes within the scope of equivalents of the present disclosure are included in the scope of the present disclosure.

The invention claimed is:

1. A method for operating an error detection IC, the error detection IC including an interface unit that receives and transmits a signal related to display data, the method comprising:

receiving a first signal including data for a specific fixed image;

selecting a fixed image based on data included in the first signal;

generating a second signal including data for outputting the selected fixed image;

generating a first error signal for notifying a first error of data for the selected fixed image included in the second signal, when it is determined that the first error exists based on data for the selected fixed image corresponding to data included in the first signal; and transmitting the second signal to a display module that includes a timing controller.

2. The method according to claim 1, wherein the interface unit further comprising:

a first interface unit receiving the first signal; and a second interface unit transmitting the second signal.

3. The method according to claim 1, wherein:

the first signal comprises data indicating a type of the fixed image; and the second signal comprises data indicating a shape and a position of the selected fixed image.

4. The method according to claim 3, wherein:

the first signal further comprises data for a background image to which the fixed image is output; and the second signal further comprises data for the background image in which the selected fixed image is overlapped.

5. The method according to claim 1, wherein the fixed image is an icon for notifying information related to a vehicle, and has a certain display shape and position corresponding to a type of the information related to the vehicle.

6. The method according to claim 1, wherein generating the first error signal further comprises:

determining a similarity between the selected fixed image corresponding to data included in the first signal and the selected fixed image included in the second signal; and determining the first error exists when the similarity is equal to or less than a certain reference value.

7. The method according to claim 1, wherein the error detection IC includes an interface unit that receives and transmits a signal related to audio data, and further comprising:

receiving an audio signal for outputting sound; and generating a second error signal for notifying a second error of data for the audio signal, when it is determined that the second error exists.

8. The method according to claim 7, wherein generating the second error signal further comprises:

determining whether the second error exists by using a Cyclical Redundancy Check or a Check Sum method.

9. The method according to claim 7, further comprising:

storing data for a certain sound corresponding to the fixed image; and generating a third error signal for notifying a third error, when it is determined that data for the selected fixed image included in the second signal and data for the audio signal are not matched, based on data for a certain sound corresponding to the selected fixed image included in the second signal.

10. An error detection IC including an interface unit that receive and transmits a signal related display data being provided in display module, the error detection IC performs operations comprising:

receiving a first signal including data for a specific fixed image;

selecting a fixed image based on data included in the first signal;

generating a second signal including data for outputting the selected fixed image;

generating a first error signal for notifying a first error of data for the selected fixed image included in the second signal, when it is determined that the first error exists based on data for the selected fixed image corresponding to data included in the first signal; and transmitting the second signal to the display module, wherein the display module includes a timing controller.

11. The error detection IC according to claim 10, wherein:

the display module is an LCD module including an LCD driver IC, and an LCD panel.

12. The error detection IC according to claim 10, wherein the interface unit further comprising:

a first interface unit receiving the first signal; and a second interface unit transmitting the second signal to the display module, further comprising:

a memory in which data for one or more fixed images are stored;

a signal processing unit configured to select a fixed image to be output to the display module from among the one or more fixed images, based on the first signal, and to generate a second signal for outputting the selected fixed image to the display module; and an image determination unit configured to provide a controller with the first error signal.

13. The error detection IC according to claim 12, wherein the image determination unit determines that the first error exists, when a similarity between the fixed image stored in the memory and the selected fixed image included in the second signal is determined to be equal to or less than a certain reference value.

14. The error detection IC according to claim 13, further comprising:

a third interface unit receiving an audio signal for outputting sound to a sound output device;

an audio determination unit configured to provide the controller with a second error signal informing of a second error of data for the audio signal, when it is determined that the second error exists; and a fourth interface unit transmitting the audio signal to the sound output device.

15. The error detection IC according to claim 14, wherein the audio determination unit determines whether the second error signal exists by using a Cyclical Redundancy Check or a Check Sum method.

16. The error detection IC according to claim 14, wherein the memory further stores data for a certain warning sound corresponding to each of the one or more fixed images, and further comprising:

a matching determination unit configured to provide the controller with a third error signal informing that an output fixed image and a sound are not matched, when it is determined that the sound output to the sound output device is not matched to the fixed image output to the display module, based on the data for the audio signal and the warning sound.

17. The error detection IC according to claim 10, wherein the first signal is a signal provided by a graphic processor or a controller.

18. The error detection IC according to claim 10, wherein the fixed image is an icon for notifying information related to a vehicle, and has a certain display position and shape corresponding to a type of the information related to the vehicle, and wherein the information related to the vehicle is information relating to any one of an operation state of a device provided in the vehicle, a device requiring inspection, and a fuel.

* * * * *